United States Patent [19]

Miyaoka

[11] 3,938,833

[45] Feb. 17, 1976

[54] UNIVERSAL PIPE JOINT CONSTRUCTION

[76] Inventor: Tadashi Miyaoka, 7-31 Horikiri-cho, Nishinomiya, Hyogo, Japan

[22] Filed: Oct. 10, 1974

[21] Appl. No.: 513,568

[52] U.S. Cl. .............................. 285/166; 285/261
[51] Int. Cl.² ....................................... F16L 27/04
[58] Field of Search ............ 285/90, 165, 166, 261, 285/266, 302, 141

[56] References Cited
UNITED STATES PATENTS

| | | | |
|---|---|---|---|
| 3,306,636 | 2/1967 | Hereth | 285/266 X |
| 3,345,087 | 10/1967 | Hanes et al. | 285/90 X |
| 3,433,504 | 3/1969 | Hanes | 285/166 |
| 3,515,414 | 6/1970 | Kowalewski | 285/302 X |

FOREIGN PATENTS OR APPLICATIONS

| | | | |
|---|---|---|---|
| 1,156,882 | 7/1969 | United Kingdom | 285/165 |

*Primary Examiner*—Andrew V. Kundrat
*Attorney, Agent, or Firm*—Farley, Forster and Farley

[57] ABSTRACT

A universal joint construction connecting the ends of two pipes is formed by a pair of articulation rings, each fitted over the end portion of one of the pipes and attached thereto. A spherical convex outer surface on each articulation ring is engaged in opposite axial directions by a pair of concave inner surfaces - one on a joint or coupling pipe, and the other on a separation preventive ring attached to the joint pipe. A sealing member is provided between each pipe and articulation ring and between each joint pipe and articulation ring. For attachment, each of the articulation and separation preventive rings is provided with an internal annular groove receiving a split lock ring which is contracted to engage an external recess in the associated pipe by radially extending screws entering the groove at circumferentially spaced locations. The recess engaged by the lock ring attaching an articulation ring to one of the pipes can be made axially wider than the lock ring to permit relative axial movement at the joint.

7 Claims, 3 Drawing Figures

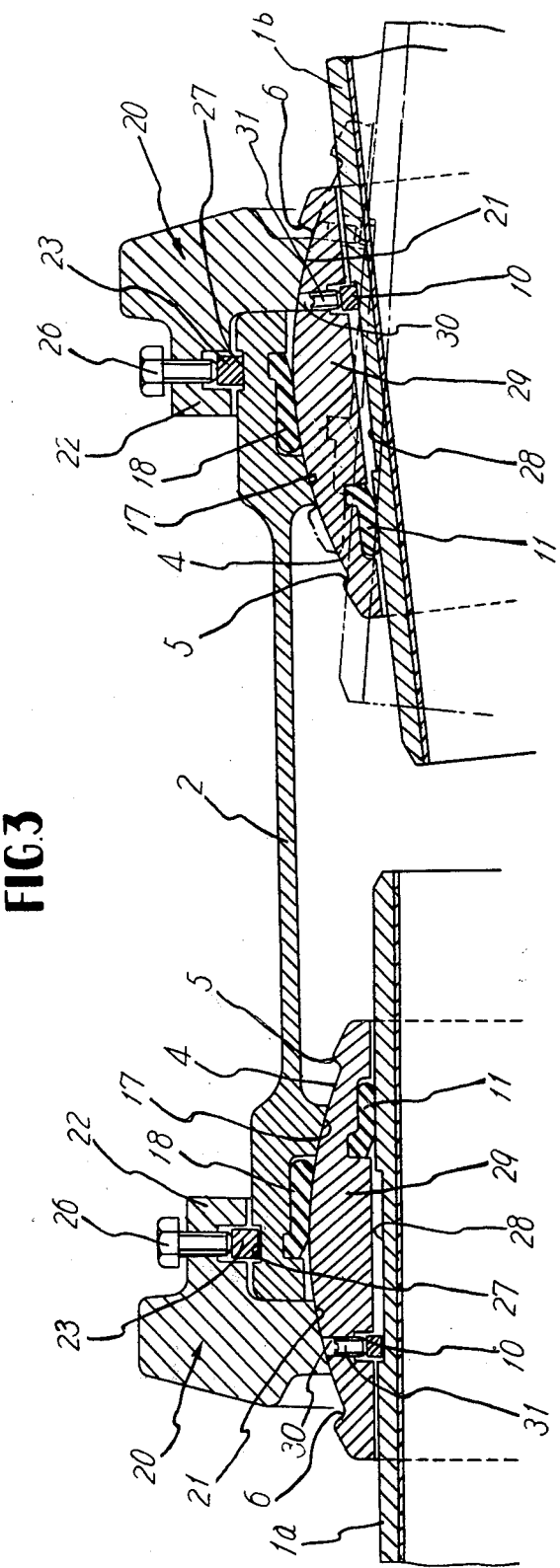

UNIVERSAL PIPE JOINT CONSTRUCTION

SUMMARY OF THE INVENTION

The present invention relates to a universal pipe joint construction and more particularly it relates to a universal pipe joint construction having a spherical articulation.

In order to protect a pipeline from movement in or displacement of the ground, especially in soft ground or in the occurrence of an earthquake, it is necessary to place in the pipeline a universal pipe joint construction which allows a large amount of bending.

The present invention is intended to provide a universal pipe joint construction fit for use in a pipeline liable to be subjected to movement or to displacement of the ground as described above.

Thus, a universal pipe joint construction according to the present invention comprises a pair of articulation rings each having a spherical convex outer surface portion and a cylindrical inner surface adapted to fit over one of the pipes, means for attaching one of the articulation rings to each one of the pipes, and a sealing member interposed between each articulation ring and the pipe associated therewith; a joint pipe having at each end thereof an annular concave inner surface adapted to engage a portion of the convex outer surface of one of the articulation rings, and a second sealing member interposed between the convex outer surface of each articulation ring and the joint pipe; and, a pair of separation preventive rings, means for attaching the separation preventive rings to the joint pipe at the ends thereof, each separation preventive ring having an annular concave inner surface which is adapted to engage a portion of the convex outer surface of one of the articulation rings in an axial direction opposite to the concave inner surface of the joint pipe engaging such one articulation ring.

Preferably, the means for attaching each of the articulation and separation preventive rings to a pipe or joint pipe, respectively, consists of an internal groove in the ring, an external recess in the pipe or joint pipe, and a split lock ring which is contracted in diameter so as to engage the recess by radially extending screws entering the groove at circumferentially spaced locations.

According to such arrangement of the present invention, since the joint pipe is capable of swinging in any direction around the center of curvature of each of the spherical convex surfaces of the articulation rings with respect to either of a pair of pipes to be connected together, said pair of pipes can articulate in any direction relative to each other. Therefore, the placement of the universal pipe joint of the present invention in a pipeline liable to be subjected to movement or to displacement of the ground accommodates such movement or displacement without allowing the latter to be concentrated on the pipe joint section or other region of the pipeline.

Furthermore, in the universal pipe joint construction, there is no need to form spherical convex surfaces directly on the outer peripheral surfaces of the connection ends of a pair of pipes, and it is only necessary to provide the straight pipe connection ends with lock ring receiving recesses, which means that there is no inconvenience of being unable to connect pipes unless they are specially manufactured. Further, the articulation rings for forming spherical convex surfaces on the outer peripheral surfaces of pipe connection ends and the separation preventive rings to be attached to the ends of the joint pipe can be firmly attached to the predetermined locations by a simple operation of causing the split lock rings fitted in inner peripheral grooves in said rings in question to be pushed out toward the pipe axis side and decreased in diameter by means of screws. The removal of these rings is possible by simply loosening the screws to allow the lock rings to spring back. Therefore, the separation of the connected pipes can be extremely easily effected.

According to another preferred embodiment of the present invention, the joint pipe is not only swingable relative to the pipe on either side but is also movable in the direction of the pipe axis, so that in the event of relative movement between two connected pipes, one pipe at one level will not be drawn toward the other pipe at a different level by the joint pipe. Thus, the different parts of the pipeline are allowed to smoothly adjust to different depths without exerting any undesirable force on the pipe joint section in the direction of the pipe axis.

Other features and merits of the present invention will be readily understood from the preferred embodiments of the invention to be described with reference to the accompanying drawings.

DESCRIPTION OF THE DRAWINGS

FIG. 3 is a longitudinal section showing the joint construction connecting two pipes in another embodiment of the invention.

DESCRIPTION OF THE PREFERRED EMBODIMENTS

Figure 1:
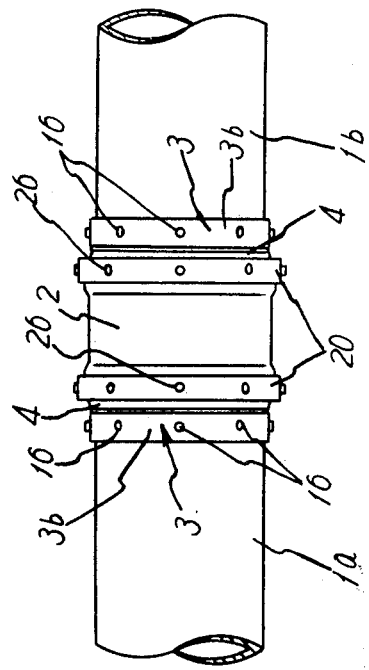
FIG. 1 is a side view of an entire joint structure.
Figure 2:
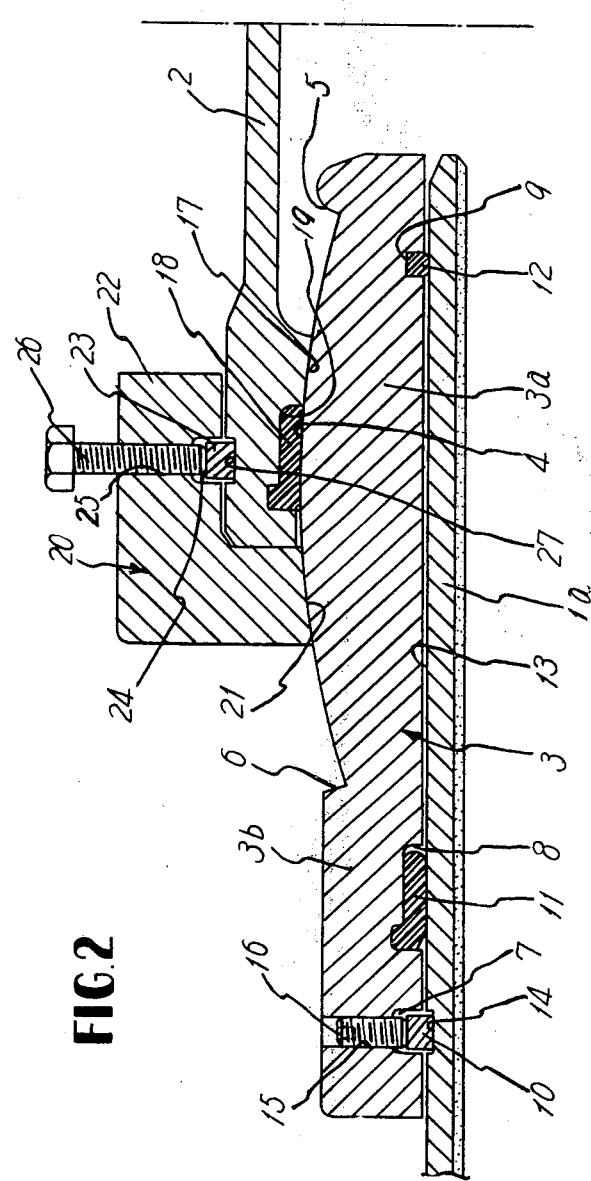
FIG. 2 is an enlarged longitudinal section showing the connection of one pipe to a joint pipe.

In FIGS. 1 and 2, the characters 1a and 1b designate pipes connected together through a joint pipe 2. Since the connection construction between the pipe 1a and joint pipe 2 is the same as the connection construction between the pipe 1b and the joint pipe 2, only the connection construction between one pipe 1a and the joint pipe 2 will be described.

An articulation ring 3 fitted over an end of the pipe 1a has a spherical convex surface 4 concentric with the center of the pipe 1a, separation preventive steps 5 and 6 at opposite ends of said spherical convex surface 4, and a projecting cylindrical portion 3b extending in the direction of the pipe axis from one end of a portion 3a having said spherical convex surface 4. The inner cylindrical surface of the ring 3 is provided with a lock ring receiving annular groove 7 and with sealing member receiving annular grooves 8 and 9 in the order mentioned from the side of the projecting cylindrical portion 3b. With a lock ring 10 cut through or split so as to be capable of being decreased in diameter against the elasticity thereof received in the annular groove 14, and a sealing member 11 and a bending preventive rubber ring 12 received in the annular grooves 8 and 9 respectively, the ring 3 is fitted over an end of the pipe 1a with the liquid sealing ring 11 and rubber ring 23 pressed against the outer cylindrical surface 13 of the pipe 1a. The outer cylindrical surface 13 is provided with a lock ring receiving annular recess 14 at a position opposed to the lock ring receiving annular groove 7 in the ring 3.

The ring 3 is provided with a plurality of circumferentially spaced threaded openings 15 radially extending between the bottom of the annular groove 7 and the outer peripheral surface of the projecting cylindrical portion 3b, and screws 16 are threadedly engaged in these threaded openings. Thus, by turning the screws 16 into the threaded openings 15 to push out the lock ring 10 from the annular groove 7 to decrease the diameter thereof until the inner peripheral surface of said lock ring 10 enters the annular recess 14, it is possible to fix the ring 3 with respect to the pipe 1a so that the ring 3 is unmovable in the direction of the pipe axis.

Each end portion of the joint pipe 2 has a spherical concave surface 17 on the inner side thereof adapted to make surface contact with a portion of said spherical convex surface 4 of the ring 3 when the joint pipe 2 is fitted axially over the spherical convex surface 4, and has an annular groove 19 for receiving a sealing member 18 pressed against the spherical convex surface 4.

A separation preventive ring 20 has a spherical concave inner surface 21 which is adapted to engage a portion of the spherical convex surface 4 in an axial direction opposite to the concave surface 17 of the joint pipe, and has a projecting cylindrical portion 22 adapted to be fitted over an end portion of the joint pipe. The inner cylindrical surface of the projecting portion 22 is provided with an annular groove 24 for receiving a split lock ring 23 similar to said lock ring 10, and there are a plurality of circumferentially spaced threaded openings 25 radially extending between the bottom of the annular groove 24 and the outer peripheral surface of the projecting cylindrical portion 22. Lock ring pusher screws 26 are engaged in these threaded openings 25.

The outer cylindrical surface of the end portion of the joint pipe 2 is provided with a shallow lock ring receiving recess 27 at a position opposed to the inner peripheral annular groove 24 in the projecting cylindrical portion 22. Therefore, by successively turning the screws 26 to push out the lock ring 23 from the annular groove 24 in which it is fitted, thereby decreasing the diameter of the lock ring 23 so that the inner peripheral portion of the lock ring 23 is fitted in the annular recess 27 in the joint pipe 2, it is possible to firmly fix the separation preventive ring 20 to the joint pipe 2.

The joint pipe 2 and pipe 1a connected in the manner described above are capable of swinging relative to each other in any direction around the center of the spherical convex surface 4 until the ring 20 abuts against the step 6 or the joint pipe 2 abuts against the step 5. Moreover, the liquid flowing through the pipe is prevented from leaking to the outside by the sealing members 11 and 18. Since the connection construction between the pipe 1b and the joint pipe 2 is the same as the connection construction between the pipe 1a and the joint pipe 2, the articulation provided by the connection of each of the pipes 1a and 1b is additive to the other, thereby providing a large angle of bend.

In an embodiment shown in FIG. 3, a lock ring receiving annular recess 28 provided in the outer cylindrical surface of each of said pipes 1a and 1b has a greater width extending in the direction of the pipe axis than the width of the lock ring 10, so that the lock ring 10 is movable in the direction of the pipe axis within the annular recess 28. With this arrangement, a spherical convex surface-equipped articulation 129 is movable axially relative to the associated pipe 1i a or 1b within a fixed range. As a result, when one pipe moves with respect to the other pipe, the moving pipe can withdraw from the joint pipe 2, so that there is no possibility of the moving pipe being pulled toward the other pipe by the joint pipe 2.

In the embodiment shown in FIG. 3, a sealing member 11 for the ring 29 is located on the side opposite to the lock ring 10, so that there is no need to use a bending preventive ring, and is spaced axially from the lock ring 10 a distance greater than the width of the recess 28. Hence, the sealing members 11 will not fall into the wide annular recesses 28 even if the pipes 1a and 1b are axially moved.

I claim:

1. A universal pipe joint for connecting a pair of pipes comprising:

a pair of articulation rings each having a spherical convex outer surface portion and a cylindrical inner surface portion adapted to fit over one of the pipes, and a sealing member interposed between each articulation ring and the pipe associated therewith;

means for attaching one of the articulation rings to each one of the pipes comprising an annular groove formed in the inner surface of the articulation ring, a first split lock ring adapted to fit in said groove, an annular recess formed in the outer surface of the pipe associated with such one articulation ring, and means for engaging the first lock ring in said recess by decreasing the diameter of the first lock ring;

a joint pipe having at each end thereof an annular concave inner surface adapted to engage a portion of the convex outer surface of one of the articulation rings, and a second sealing member interposed between the convex outer surface of each articulation ring and the joint pipe; and, a pair of separation preventive rings, and means for attaching the separation preventive rings to the joint pipe at the ends thereof, each separation preventive ring having an annular concave inner surface which is adapted to engage a portion of the convex outer surface of one of the articulation rings in an axial direction opposite to the concave inner surface of the joint pipe engaging such one articulation ring.

2. A pipe joint as set forth in claim 1 wherein the articulation ring is provided with a cylindrical portion extending axially from the convex outer surface portion thereof, said annular groove is formed in said cylindrical portion, and said means for engaging the lock ring in said recess includes a plurality of radially extending screws spaced circumferentially around said cylindrical portion and engageable with said lock ring in said groove.

3. A pipe joint as set forth in claim 1 wherein said means for engaging the lock ring in said recess includes a plurality of circumferentially spaced threaded openings extending between said groove and the convex surface of the articulation ring, and headless screws adapted to be sunk within said threaded openings.

4. A pipe joint as set forth in claim 1 wherein said annular recess formed in the outer surface of the pipe has a greater width in the direction of the pipe axis than the lock ring, thereby permitting relative axial movement between the articulation ring and the pipe associated therewith.

5. A pipe joint as set forth in claim 1 wherein said means for attaching the separation preventive rings to the joint pipe comprises an inner cylindrical surface on each separation preventive ring adapted to fit over an outer cylindrical surface on the joint pipe, an annular groove formed in said inner cylindrical surface of the separation preventive ring, a second split lock ring adapted to fit in said groove, an annular recess formed in the outer cylindrical surface on the joint pipe, and means for engaging the second lock ring in said recess by decreasing the diameter of the second lock ring.

6. A pipe joint as set forth in claim 1 wherein said means for attaching the separation preventive rings to the joint pipe comprises an inner cylindrical surface on each separation preventive ring adapted to fit over an outer cylindrical surface on the joint pipe, an annular groove formed in said inner cylindrical surface of the separation preventive ring, a second split lock ring adapted to fit in said groove, an annular recess formed in the outer cylindrical surface on the joint pipe, and means for engaging the second lock ring in said recess by decreasing the diameter of the second lock ring.

7. A pipe joint as set forth in claim 1 wherein said concave inner surfaces of the joint pipe and one of the separation preventive rings which engage the convex outer surface of one of the articulation rings are spaced apart in the axial direction, and said second sealing member is located between such axially spaced concave inner surfaces.

* * * * *

UNITED STATES PATENT AND TRADEMARK OFFICE
CERTIFICATE OF CORRECTION

PATENT NO. : 3,938,833
DATED : February 17, 1976
INVENTOR(S) : TADASHI MIYAOKA

It is certified that error appears in the above-identified patent and that said Letters Patent are hereby corrected as shown below:

Column 3, line 64, "129" should read --ring 29--;

Column 3, lines 64 and 65, the words "is movable axially relative to the associated pipe" should not be italicized;

Column 3, line 65, "li a" should read --la--.

Signed and Sealed this

Thirteenth Day of July 1976

[SEAL]

Attest:

RUTH C. MASON
*Attesting Officer*

C. MARSHALL DANN
*Commissioner of Patents and Trademarks*